(12) United States Patent
Yamashita et al.

(10) Patent No.: US 9,218,201 B2
(45) Date of Patent: Dec. 22, 2015

(54) MULTICORE SYSTEM AND ACTIVATING METHOD

(71) Applicant: FUJITSU LIMITED, Kawasaki-shi, Kanagawa (JP)

(72) Inventors: Koichiro Yamashita, Hachioji (JP); Hiromasa Yamauchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 477 days.

(21) Appl. No.: 13/622,536

(22) Filed: Sep. 19, 2012

(65) Prior Publication Data

US 2013/0024870 A1    Jan. 24, 2013

Related U.S. Application Data

(63) Continuation of application No. PCT/JP2010/055138, filed on Mar. 24, 2010.

(51) Int. Cl.
| | |
|---|---|
| *G06F 9/50* | (2006.01) |
| *G06F 9/46* | (2006.01) |
| *G06F 9/48* | (2006.01) |
| *G06F 9/52* | (2006.01) |

(52) U.S. Cl.
CPC ............. *G06F 9/4881* (2013.01); *G06F 9/505* (2013.01); *G06F 9/52* (2013.01)

(58) Field of Classification Search
None
See application file for complete search history.

(56) References Cited

U.S. PATENT DOCUMENTS

| | | | |
|---|---|---|---|
| 4,630,193 A * | 12/1986 | Kris | ............................... 713/502 |
| 5,687,073 A | 11/1997 | Kishimoto | |
| 6,981,258 B1 | 12/2005 | Takakura | |
| 7,810,094 B1 * | 10/2010 | McClure et al. | .............. 718/102 |
| 2004/0123201 A1 | 6/2004 | Nguyen et al. | |
| 2010/0049960 A1 | 2/2010 | Okamoto et al. | |
| 2010/0223618 A1 * | 9/2010 | Fu et al. | ......................... 718/102 |

FOREIGN PATENT DOCUMENTS

| | | |
|---|---|---|
| JP | 62-92045 | 4/1987 |
| JP | 4-60843 | 2/1992 |
| JP | 7-253960 | 10/1995 |
| JP | 11-265297 | 9/1999 |
| JP | 2000-339284 | 12/2000 |
| JP | 2001-117786 | 4/2001 |
| JP | 2006-252437 | 9/2006 |

(Continued)

OTHER PUBLICATIONS

Extended European Search Report issued Sep. 6, 2013 in corresponding European Application No. 10848380.1.

(Continued)

*Primary Examiner* — Tammy Lee
*Assistant Examiner* — Michael Ayers
(74) *Attorney, Agent, or Firm* — Staas & Halsey LLP

(57) ABSTRACT

A multicore system includes multiple processor cores; a scheduler in each of the processor cores and allocating a process to the processor cores when having a master authority that is an authority to assign processes; and a master controller performing control to repeat until a process to be executed no longer exists, a cycle in which the schedulers transfer the master authority to another processor core after receiving the master authority and before assigning a process to the processor cores, discards the master authority after assigning the process to the processor cores, and enters a state of waiting to receive the master authority.

14 Claims, 8 Drawing Sheets

(56) References Cited

FOREIGN PATENT DOCUMENTS

| | | |
|---|---|---|
| JP | 2008-186175 | 8/2008 |
| JP | 2009-75910 | 4/2009 |
| JP | 2009-98769 | 5/2009 |

OTHER PUBLICATIONS

Japanese Office Action mailed May 21, 2013 in corresponding Japanese Application No. 2012-506709.

International Preliminary Report on Patentability issued Oct. 4, 2012 (English Translation mailed Oct. 26, 2012) in corresponding International Patent Application No. PCT/JP2010/055138.

Chinese Office Action issued Oct. 8, 2014 in corresponding Chinese Patent Application No. 201080065635.X.

International Search Report of Corresponding PCT Application PCT/JP2010/055138 mailed Jun. 15, 2010.

\* cited by examiner

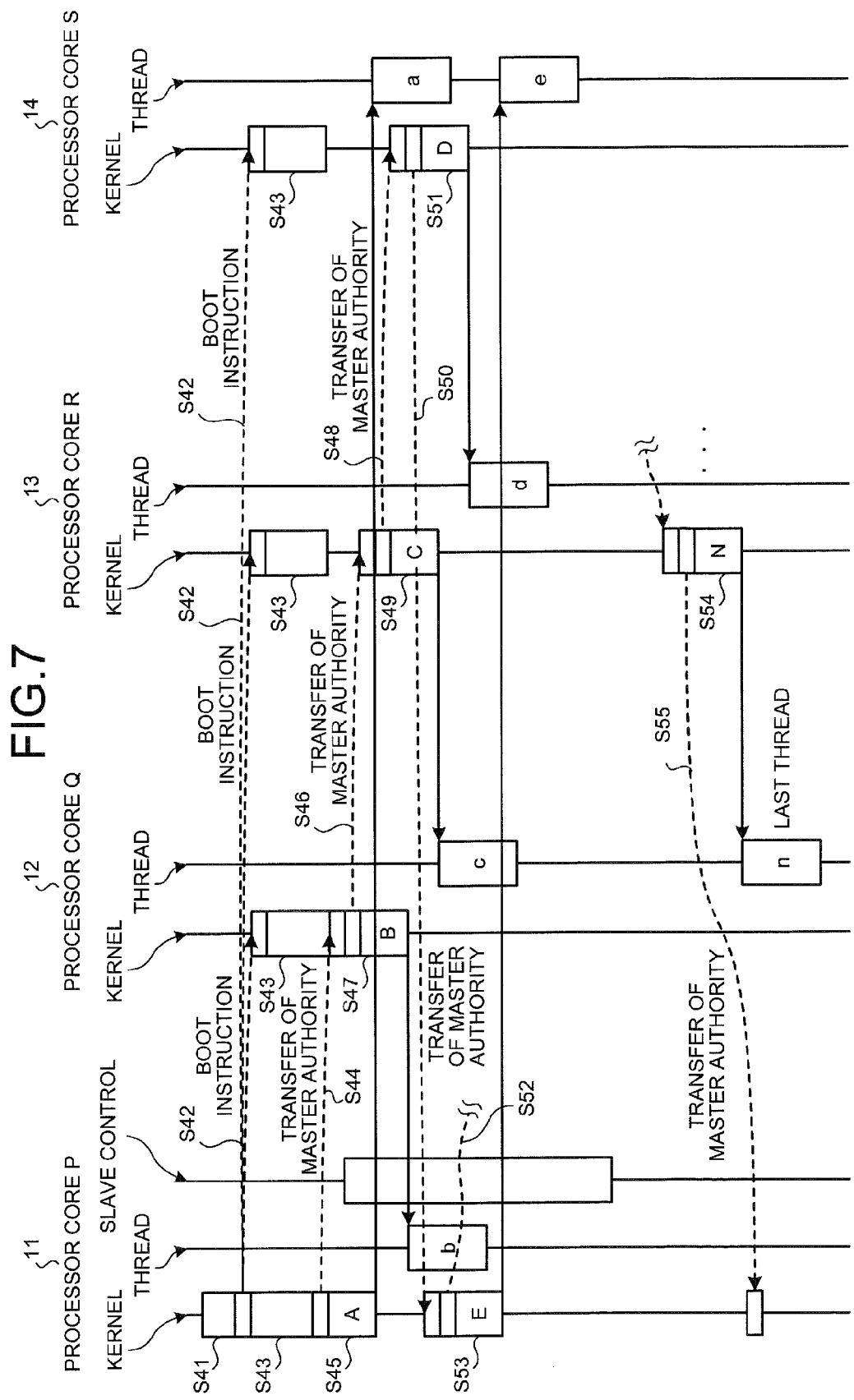

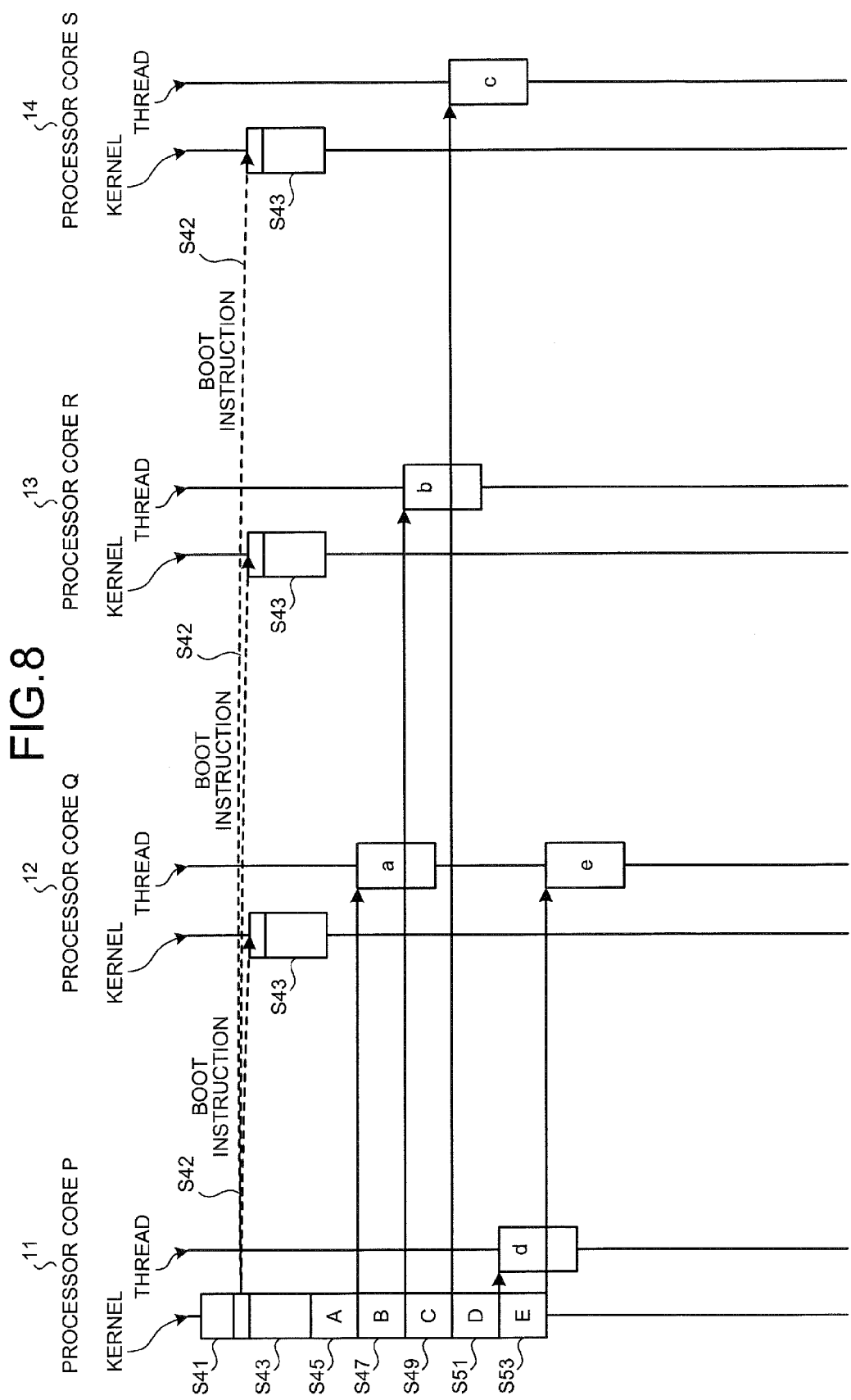

MULTICORE SYSTEM AND ACTIVATING METHOD

CROSS REFERENCE TO RELATED APPLICATIONS

This application is a continuation application of International Application PCT/JP2010/055138, filed on Mar. 24, 2010 and designating the U.S., the entire contents of which are incorporated herein by reference.

FIELD

The embodiments discussed herein are related to a multicore system and an activating method.

BACKGROUND

With regard to an information processing apparatus such as a computer and a portable terminal or an image or audio processing apparatus such as a digital camera and a television system, it is conventionally desired to complete the startup of the apparatus as rapidly as possible after a user turns on the apparatus. One mode that rapidly starts up an apparatus is a hibernate boot mode. The hibernate boot mode is a technique of restoring the previous operating state retained in memory etc., for rapid startup without executing a normal activation sequence. A user interface (UI) preceding activation mode also exists. The UI preceding activation mode is a technique of displaying a dummy screen to a user at an earlier stage of the activation of the apparatus so that the apparatus seems to be rapidly activated.

On the other hand, a multiprocessor system having multiple processors and a multicore system having multiple processor cores (hereinafter collectively referred to as a multicore system) exist. The multicore system has a scheduling mode in which multiple processes are respectively allocated to multiple schedulers in advance to sequentially execute the processes at the selected schedulers according to the allocation. The multiprocessor system has a mode in which multiple schedulers having different algorithms is prepared to perform scheduling with a scheduler having an appropriate algorithm for each task. The multiprocessor system also has a mode in which a processor having a master scheduler and a processor having a slave scheduler are included such that the master scheduler controls the execution of a process by the slave scheduler.

For examples of the technology above, refer to Japanese Laid-Open Patent Publication Nos. 2001-117786, H4-60843, and H11-265297.

However, the hibernate boot mode has a problem in that a storage area is necessary for storing the operating state of an apparatus. In the UI preceding activation mode, the activation of the apparatus is not actually rapidly completed. If processes are preliminarily allocated to respective schedulers, the processes cannot be flexibly allocated to the schedulers. Therefore, this is not suitable for a system, such as a mobile telephone, that allows a user to update the system and to add a new function while in use, for example. If multiple schedulers operate, it is problematic that the schedulers must be synchronized so as not to create a conflict of established memory or interrupt numbers. If multiple schedulers having different algorithms are operated and compete based on speed of scheduling, a processor that is operated by a scheduler that is not employed ends up performing unnecessary computation. This is problematic in terms of power consumption. Even when multiple schedulers having different algorithms are prepared, if load is concentrated on a scheduler having any algorithm, a process is delayed in the processor operating the scheduler.

SUMMARY

According to an aspect of an embodiment, a multicore system includes multiple processor cores; a scheduler in each of the processor cores and allocating a process to the processor cores when having a master authority that is an authority to assign processes; and a master controller performing control to repeat until a process to be executed no longer exists, a cycle in which the schedulers transfer the master authority to another processor core after receiving the master authority and before assigning a process to the processor cores, discards the master authority after assigning the process to the processor cores, and enters a state of waiting to receive the master authority.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram of the operation of the multicore system in the activating method according to the second embodiment; and FIG. 8 depicts operation of the multicore system by an activating method that is a comparison example.

DESCRIPTION OF EMBODIMENTS

Embodiments of a multicore system and an activating method according to the present invention will now be described with reference to the drawings. These embodiments do not limit the present invention.

In the first embodiment, after a scheduler operating in a processor core transfers master authority to a scheduler of another processor core, processes are assigned to the processor cores. As a result, multiple processor cores concurrently execute respectively assigned processes in parallel while timing is shifted bit by bit.

Figure 1:
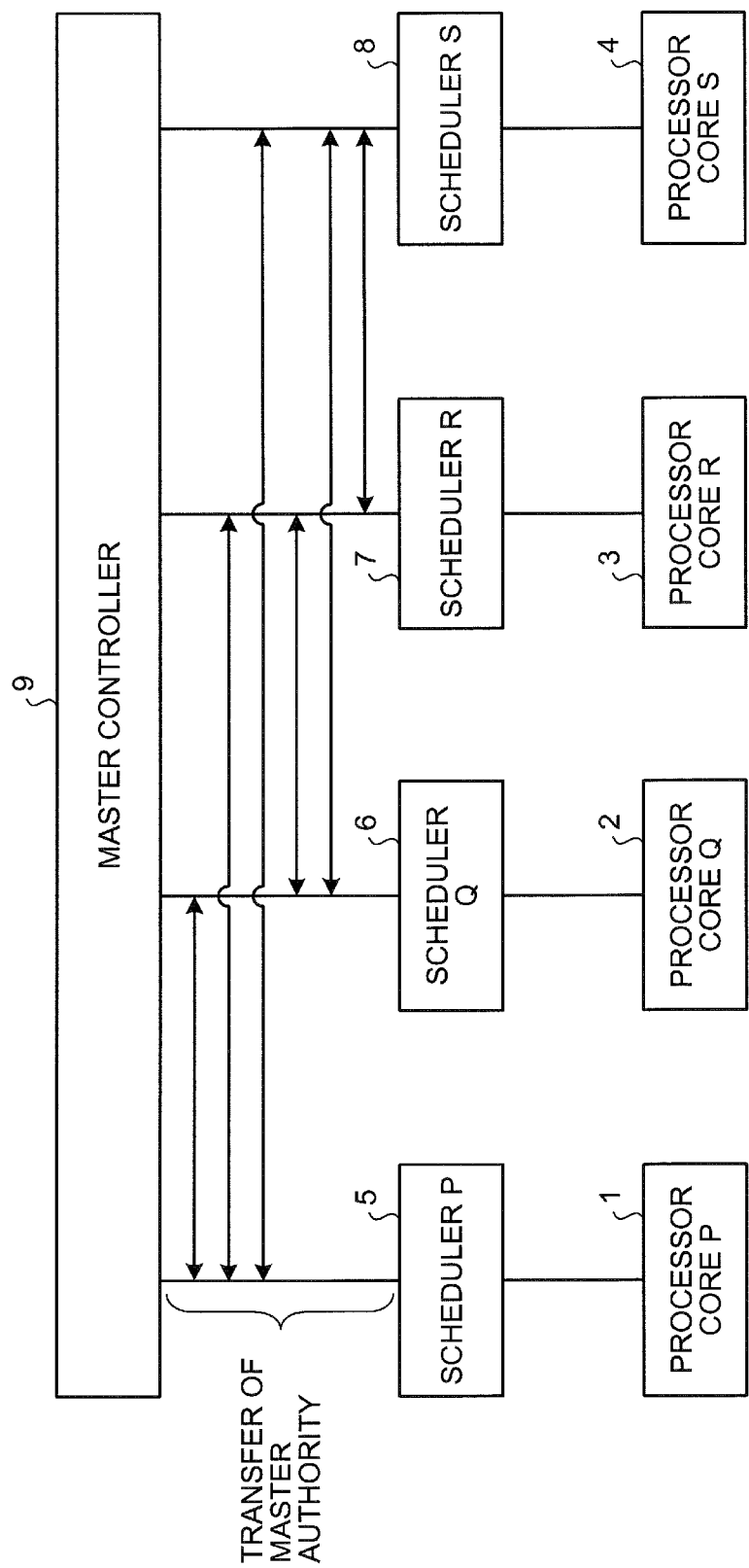
FIG. 1 is a block diagram of a multicore system according to a first embodiment.

FIG. 1 is a block diagram of a multicore system according to the first embodiment. As depicted in FIG. 1, the multicore system has multiple processor cores, e.g., in the depicted example, four, processor cores 1, 2, 3, and 4. Nonetheless, the number is not particularly limited. Schedulers 5, 6, 7, and 8 operate in the processor cores 1, 2, 3, and 4, respectively. Each of the schedulers 5, 6, 7, and 8 performs scheduling when having the master authority. As a result of the scheduling, processes are assigned to the processor cores 1, 2, 3, and 4. The master authority is an authority to perform the scheduling. The multicore system has a master controller 9 controlling the transfer of the master authority among the schedulers 5, 6, 7, and 8.

After receiving the master authority and before performing the scheduling, the schedulers 5, 6, 7, and 8 transfer the authority to another processor core 1, 2, 3, or 4. After performing the scheduling, the schedulers 5, 6, 7, and 8 discard the master authority and enter a state of waiting to again receive the master authority. The master controller 9 provides control such that each of the schedulers 5, 6, 7, and 8 repeats such a cycle until processes to be executed no longer exist. The schedulers 5, 6, 7, and 8 and the master controller 9 are implemented by the processor cores 1, 2, 3, and 4 executing software such as a kernel portion of an operating system (OS), for example.

Figure 2:
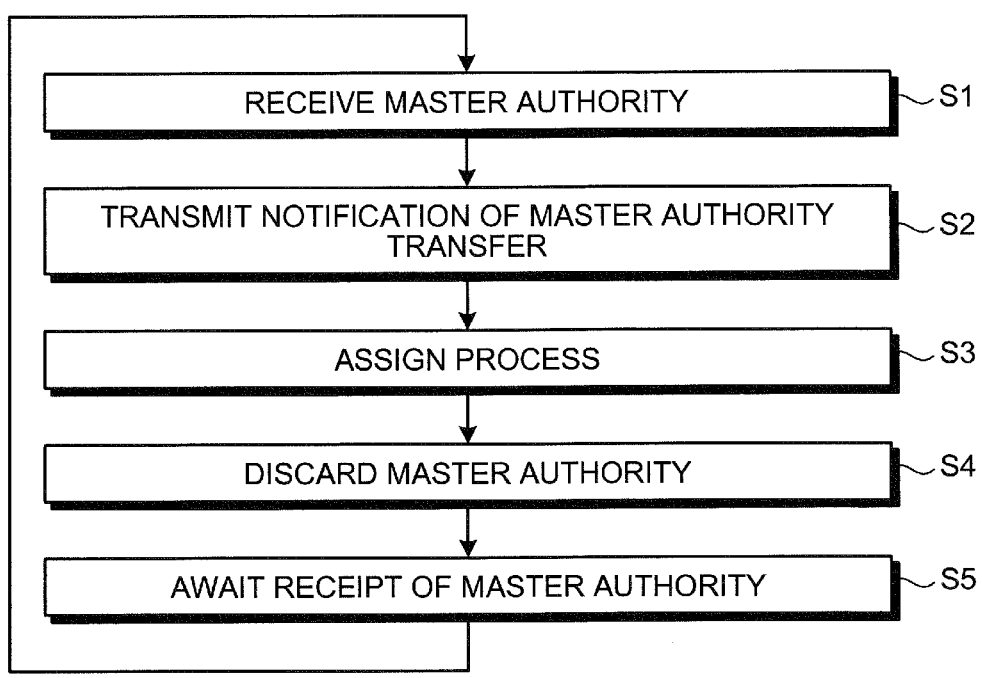
FIG. 2 is a flowchart of an activating method according to the first embodiment.

FIG. 2 is a flowchart of an activating method according to the first embodiment. The flowchart depicted in FIG. 2 depicts operation of a scheduler among the schedulers. In this flowchart, the operation of a scheduler P5 of the configuration depicted in FIG. 1 will be described. The other schedulers Q6, R7, and S8 depicted in FIG. 1 operate in the same way.

As depicted in FIG. 2, when an apparatus having the multicore system described above is powered on (cold-booted, cold-started) or reset (cold-rebooted, cold-restarted), the scheduler P5 receives the master authority (step S1). The scheduler P5 transmits, to any one of the other processor cores Q2, R3, and S4, notification that the master authority is transferred to the scheduler operating in the corresponding processor core (step S2). Upon completing the transmission, the scheduler P5 performs the scheduling to assign a process to the other processor cores Q2, R3, and S4 (step S3). Upon completing the scheduling, the scheduler P5 discards the master authority (step S4) and enters the state of waiting to again receive the master authority (step S5). Since the schedulers Q6, R7, and S8, which do not initially receive the master authority, are in the state of waiting until receiving the master authority, the schedulers Q6, R7, and S8 are started from step S5. The schedulers P5, Q6, R7, and S8 repeat steps S1 to S5 until processes to be executed no longer exist.

According to the first embodiment, since each of the schedulers performs the scheduling after transferring the master authority to another scheduler, a portion of a process assigned to each processor core is executed in parallel with a portion of another process assigned to another processor core. Therefore, as compared to the case of not executing portions of processes assigned to the processor cores in parallel, an apparatus having the multicore system can rapidly be activated. Since a scheduler operating in each of the processor cores receives the transfer of the master authority from another scheduler to perform the scheduling, multiple the schedulers perform the scheduling in parallel. Therefore, as compared to a case where only one scheduler acting as a master performs the scheduling for all of the processor cores, an apparatus having the multicore system can rapidly be activated.

In a second embodiment, the multicore system of the first embodiment is used as an embedded system of a portable terminal such as a mobile telephone terminal or an electric home appliance such as a television system, for example.

Figure 3:
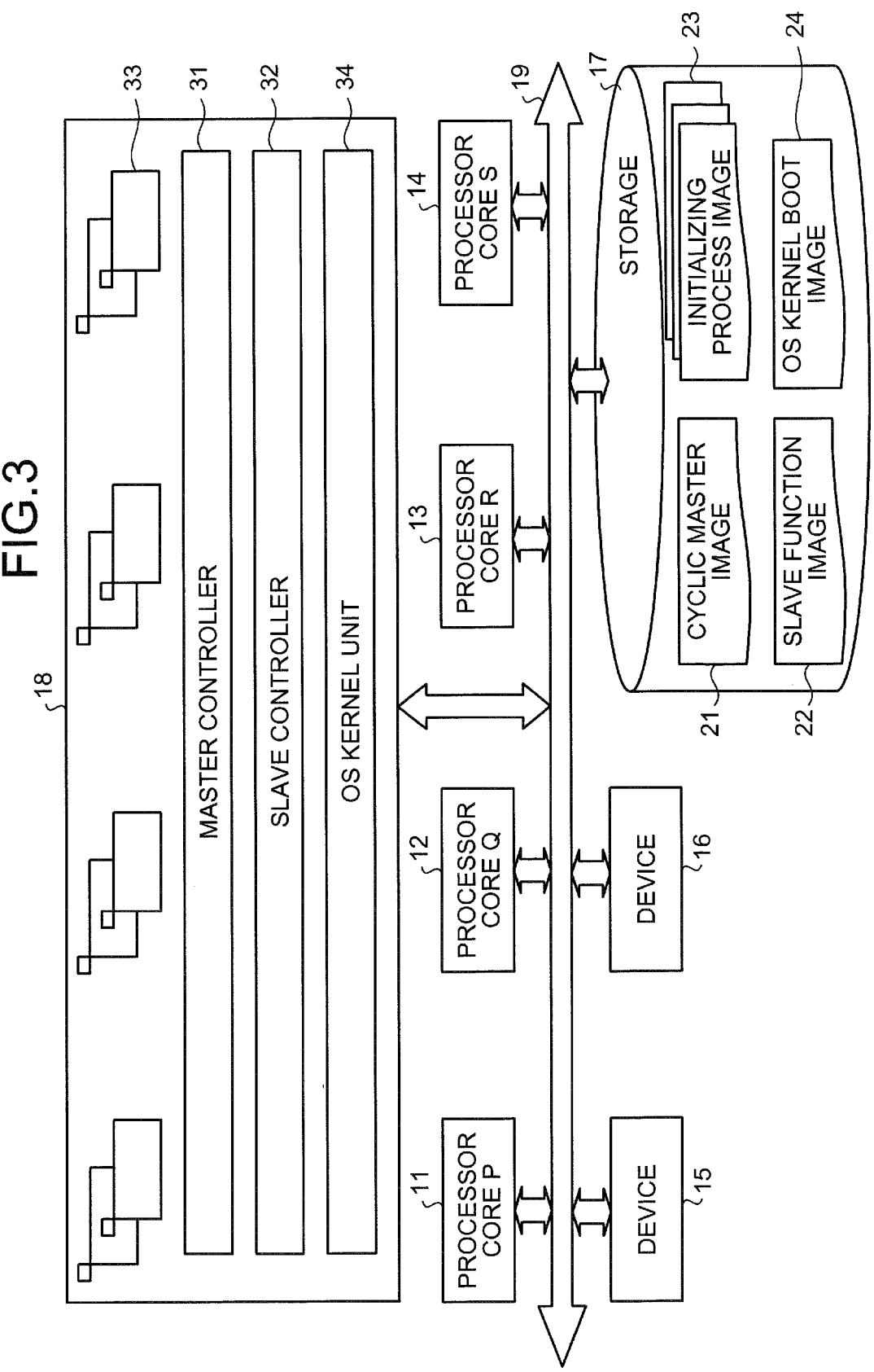
FIG. 3 is a block diagram of a multicore system according to a second embodiment.

FIG. 3 is a block diagram of a multicore system according to the second embodiment. As depicted in FIG. 3, the multicore system includes processor cores 11, 12, 13, and 14, devices 15 and 16 executing various processes such as an image process, an audio process and a communication process, and storage 17 such as a hard disk and main memory 18 used as a work area. The processor cores 11, 12, 13, and 14, the devices 15 and 16, the storage 17, and the main memory 18 are connected respectively through a bus 19. Although an operating system separately operates in the processor cores 11, 12, 13, and 14, one system is constructed as a whole. The number of the processor cores and the number of the devices are not limited to the depicted example. For example, the number of the processor cores may be two, three, or five or more.

The storage 17 stores a cyclic master image 21, a slave function image 22, an initializing process image 23, and an OS kernel boot image 24. The cyclic master image 21 is data of a program controlling the circulation of the master authority among the schedulers. The slave function image 22 is data of a program controlling the receipt and activation of processes assigned by the schedulers in the processor cores. The initializing process image 23 is data of a program initializing various devices. The OS kernel boot image 24 is data of a program reading and operating the kernel of the operating system.

The cyclic master image 21, the slave function image 22, the initializing process image 23, and the OS kernel boot image 24 are read from the storage 17 and loaded on the main memory 18 consequent to the execution of a boot program. As a result, a master controller 31, a slave controller 32, an initializing thread 33 as an initializing process, and an OS kernel unit 34 are implemented on the main memory 18.

The OS kernel unit 34 is a portion implemented with a basic function of the operating system, e.g., a function such as activation of a process and a thread. The OS kernel unit 34 includes non-depicted schedulers operating for respective processor cores. The master controller 31 is a program controlling the circulation of the master authority among the schedulers. For example, a master flag described in a multi-core operating system may be used as an example of the master authority. In this case, the master controller 31 controls this master flag. The initializing thread 33 is a program that initializes various devices. The slave controller 32 is a program residing on all the processor cores to control the receipt and activation of the processes assigned by the schedulers.

Figure 4:
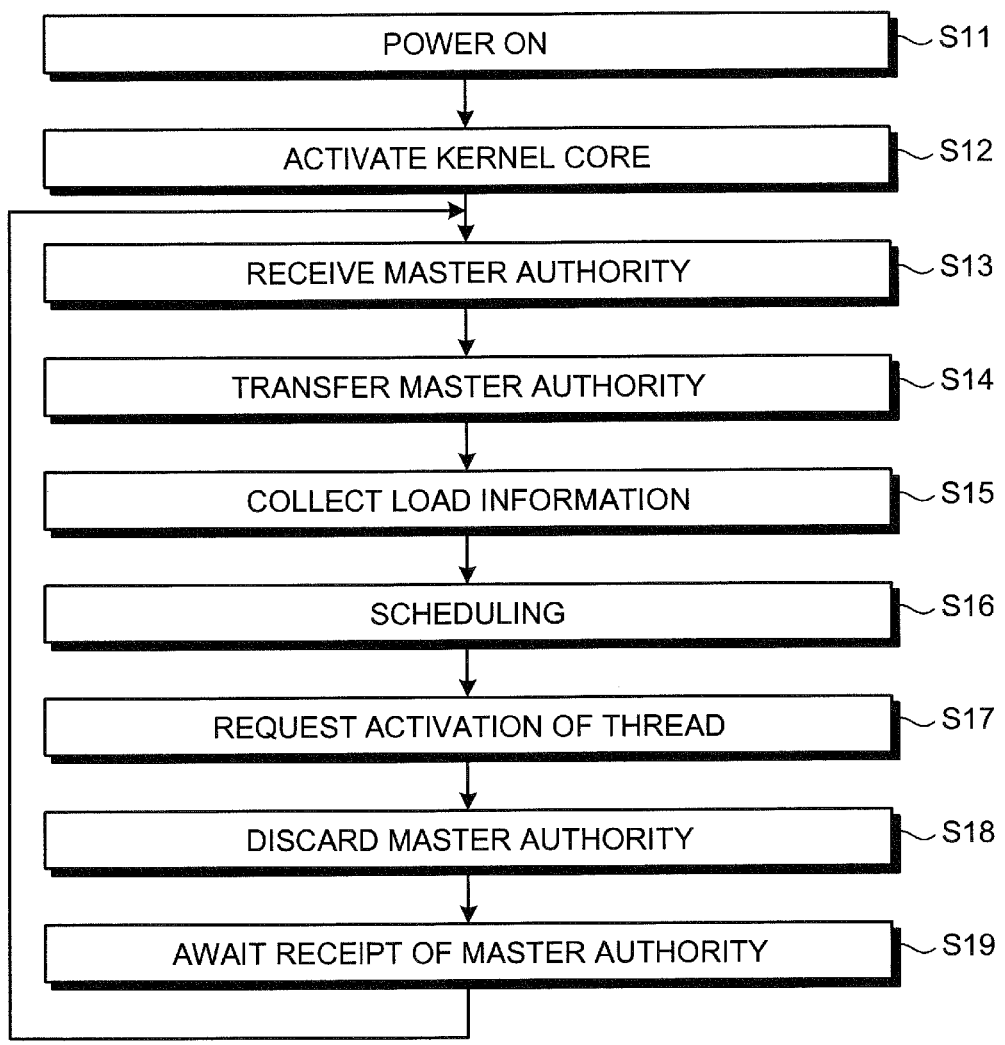
FIG. 4 is a flowchart of the operation of a processor core that receives a master authority first in the activating method according to the second embodiment.

FIG. 4 is a flowchart of the operation of a processor core that receives the master authority first in the activating method according to the second embodiment. In this description, a kernel operating in a processor core P11 of the configuration depicted in FIG. 3 is assumed to receive the master authority first.

As depicted in FIG. 4, when an apparatus having the multicore system depicted in FIG. 3 is powered on or reset (step S11), a reset signal is input to the processor cores P11, Q12, R13, and S14. As a result, an internal activation program runs in the processor cores P11, Q12, R13, and S14. Described in the activation program is the definition of an address space accessible by the processor cores P11, Q12, R13, and S14 in the apparatus. The activation program further includes the description of the start address of the boot program. Such an activation program is sometimes referred to as a startup routine.

The processor cores P11, Q12, R13, and S14 read the boot program according to the procedure of the activation program to read and activate a kernel core (step S12). The kernel core is a basic portion of the operating system. By activating the kernel core, the initial setting of the processor cores P11, Q12, R13, and S14 is performed and the operating system runs in the processor cores P11, Q12, R13, and S14. Various functional services are not activated by only the kernel core.

A kernel operating in the processor core P11 receives the master authority (step S13). The kernel operating in the processor core P11 transfers the master authority to another processor core Q12, R13, or S14 through inter-processor-core communication (step S14). The transfer may be to any processor core. For example, the master authority may be transferred based on a processor core number. For example, the destination processor core may be defined as a processor core having a number one greater than the number of the source processor core. For example, if the number of the source processor core is the maximum value, the destination processor core may be defined as a processor core having the smallest number. Even if the master authority is transferred, the kernel operating in the processor core P11 has the master authority until discarding the master authority.

After transferring the master authority, the kernel operating in the processor core P11 collects the load information of the processor cores P11, Q12, R13, and S14 (step S15). The load information is information indicative of a usage status of resources such as a memory resource used by the processor cores P11, Q12, R13, and S14. The load information is stored in memory such as the main memory 18, for example. The kernel operating in the processor core P11 performs scheduling based on the collected load information such that the load of the processor cores P11, Q12, R13, and S14 is distributed (step S16).

The kernel operating in the processor core P11 secures resources based on resource information prepared in advance and requests the processor core assigned with a initializing thread to activate the initializing thread (step S17). The resource information includes information related to a utilized resource, a context area, a process (thread) ID, a process (thread) name, and other competing processes (threads) as information fixed each time the apparatus is activated or reset. If the initializing thread has a reserved processing processor core, the kernel operating in the processor core P11 makes a request for activation to the reserved processor core without performing the scheduling.

The kernel operating in the processor core P11 then discards the master authority (step S18) and enters the state of waiting to receive the master authority again (step S19). When receiving the master authority again (step S13), the kernel operating in the processor core P11 repeats step S13 to step S19.

Figure 5:
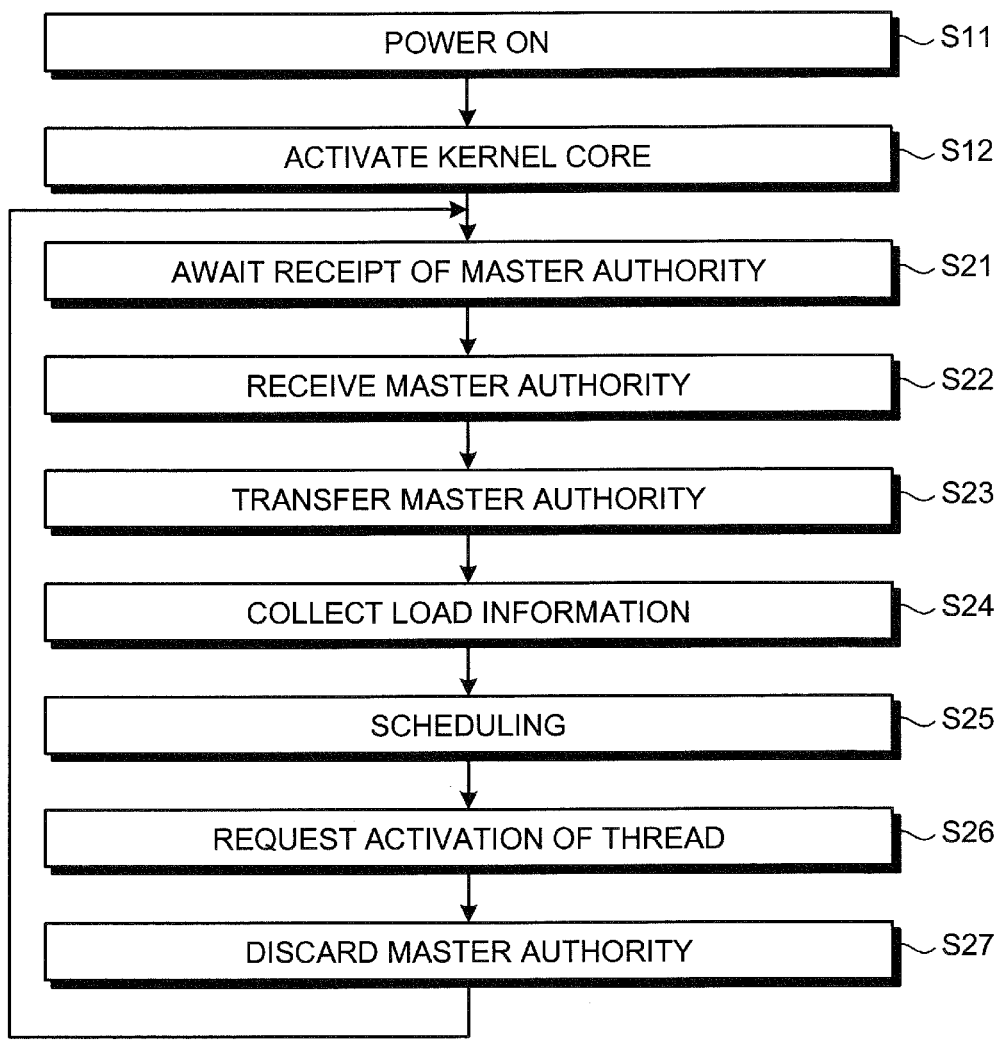
FIG. 5 is a flowchart of the operation of a processor core that does not receive the master authority first in the activating method according to the second embodiment.

FIG. 5 is a flowchart of the operation of a processor core that does not receive the master authority first in the activating method according to the second embodiment. The description will be made of the operation of a kernel operating in the processor core Q12 among the processor cores Q12, R13, and S14 that do not receive the master authority first. Kernels operating in the processor cores R13 and S14 operate in the same way.

As depicted in FIG. 5, until the kernel core enters an activated state after the apparatus is powered on or reset, the operation is as described for the processor core P11 with reference to FIG. 4 (step S11, step S12). When the kernel core is activated, the kernel operating in the processor core Q12 enters the state of waiting to receive the master authority from the other processor cores P11, R13, and R14 (step S21). Upon receiving the master authority while waiting (step S22), the kernel operating in the processor core Q12 transfers the master authority to another processor core P11, R13, or S14 through inter-processor-core communication (step S23). The destination of the transfer may be determined in the order of the processor core number as described with respect to step 14 in FIG. 4, for example. At this point, the kernel operating in the processor core Q12 has the master authority.

The subsequent operation is as described for the kernel operating in the processor core P11 with reference to FIG. 4. For example, as described above, the kernel operating in the processor core Q12 collects the load information (step S24), performs the scheduling (step S25), and requests the activation of the initializing thread (step S26). The kernel operating in the processor core Q12 discards the master authority (step S27) and returns to the state of waiting to receive the master authority again (step S21) to return this operation.

When a kernel operating in a certain processor core transfers the master authority to another processor core, multiple processor cores may have the master authority at the same time. For example, in the example depicted in FIGS. 4 and 5, the kernel operating in the processor core P11 is assumed to transfer the master authority to the processor core Q12. In this case, the processor core P11 and the processor core Q12 hold the master authority until each discards the master authority.

When a normal process is activated in the apparatus under operation rather than at the time of activation of the apparatus as in the second embedment, if multiple processor cores have the master authority at the same time in this way, the following failure may occur. For example, contention occurs if multiple kernels having the master authority accidentally attempt to secure memory resources etc., at the same time. On the other hand, the second embodiment corresponds to the operation at the time of activation of the apparatus. The resources necessary for threads and processes activated at the activation of the apparatus are reserved as resource information in a function table etc., prepared as the activation information of the operating system in advance. Therefore, no failure occurs even if multiple processor cores secure resources at the same time.

Figure 6:
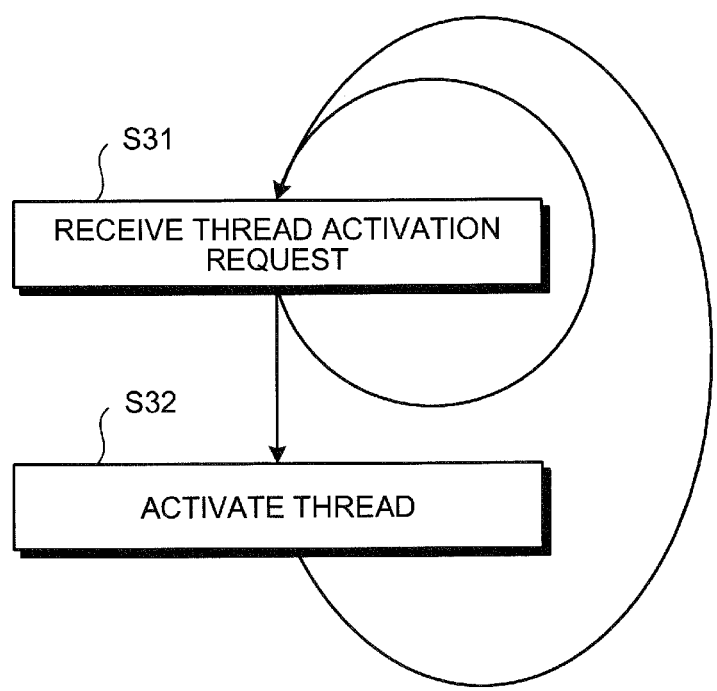
FIG. 6 is a diagram of state transition in a slave control state in the activating method according to the second embodiment.

FIG. 6 is a diagram of state transition in a slave control state in the activating method according to the second embodiment. As depicted in FIG. 6, after the apparatus is powered on or reset, when the kernel core is activated, the processor cores P11, Q12, R13, and R14 are put into a state of receiving an activation request for an initializing thread by the slave controller 32 (step S31). Upon receiving the activation request for an initializing thread from another processor core, the processor cores P11, Q12, R13, and R14 activate the corresponding thread (step S32). Here, the processor core activating the requested initializing thread updates the load information to indicate that resources such as a memory resource used for activating the corresponding thread are in use. Upon completion of the initialization of devices by the requested initializing thread, the processor core returns to the state of receiving the activation request for another initializing thread from other processor cores.

As described above, the schedulers operating in the processor cores P11, Q12, R13, and R14 make a request for the activation of an initializing thread to a processor core having a lower load based on the load information. Since multiple schedulers may concurrently operate here, the load information collected by the schedulers does not necessarily reflect the current load statuses of the processor cores P11, Q12, R13, and R14 correctly. Therefore, if the initializing threads are assigned to the processor cores based on the load information, the load of the processor cores P11, R13, and R14 may temporarily be biased. However, such a bias of the load is averaged while a multiplicity of, for example, about 50 to 100, or 100 or more, initializing threads are sequentially assigned to the processor cores P11, Q12, R13, and R14. Therefore, this is not particularly problematic.

FIG. 7 is a diagram of the operation of the multicore system in the activating method according to the second embodiment. As depicted in FIG. 7, when the apparatus having the multicore system depicted in FIG. 3 is powered on or reset, the activation program runs in the processor core P11, causing the boot program to run (step S41). A boot instruction is given from the processor core P11 to the other processor cores Q12, R13, and S14 through inter-processor-core communication (step S42). The processor cores P11, Q12, R13, and S14 activate kernel cores and perform initial setting (step S43). Here, the processor core P11 is given the master authority.

The processor core P11 transfers the master authority to the processor core Q12 through inter-processor-core communication (step S44). The processor core P11 performs the scheduling of an initializing thread a (indicated by "A" in FIG. 7) (step S45) and discards the master authority.

The processor core Q12 receiving the master authority transfers the master authority to the processor core R13 through inter-processor-core communication (step S46). The processor core Q12 performs the scheduling of an initializing thread b (indicated by "B" in FIG. 7) (step S47) and discards the master authority.

The processor core R13 receiving the master authority transfers the master authority to the processor core S14 through inter-processor-core communication (step S48). The processor core R13 performs the scheduling of an initializing thread c (indicated by "C" in FIG. 7) (step S49) and discards the master authority.

The processor core S14 receiving the master authority transfers the master authority to the processor core P11 through inter-processor-core communication (step S50). The processor core S14 performs the scheduling of an initializing thread d (indicated by "D" in FIG. 7) (step S51) and discards the master authority.

The processor core P11 receiving the master authority transfers the master authority to the processor core Q12 through inter-processor-core communication (step S52). The processor core P11 performs the scheduling of an initializing thread e (indicated by "E" in FIG. 7) (step S53) and discards the master authority. The same operation is subsequently repeated until the scheduling of a last initializing thread n (indicated by "N" in FIG. 7) is completed (step S54). The processor core performing the scheduling of the last initializing thread n is the processor core R13 in the depicted example and returns the master authority to the processor core P11 receiving the master authority first (step S55). As a result, the control of circulating the master authority is canceled.

Each of the initializing thread is allocated by the schedulers to an available processor core, i.e., a processor core not executing a process. Although not particularly limited, in the example depicted in FIG. 7, when the processor core P11 performs the scheduling A, the processor core Q12 and the processor core R13 execute processes and the processor core S14 executes no process. Therefore, the initializing thread "a" is assigned to the processor core S14 and executed by the processor core S14. Similarly, the initializing thread b is assigned to the processor core P11, which is available during the scheduling B, and executed by the processor core P11. The same applies to the initializing threads c, d, e, and n.

As described, in the second embodiment, multiple schedulers perform the scheduling of different initializing threads in parallel. Multiple processor cores execute different initializing threads in parallel. Equation (1) expresses a time T from the time when the initial setting of the processor cores P11, Q12, R13, and S14 is completed by the activation of the kernel cores until the initialization of devices is completed by F initializing threads. In this equation, G denotes the number of processor cores; H [ms] denotes an average scheduling time in a processor core; J [ns] denotes an average communication time between processor cores; and K [ms] denotes an average initialization time of a device. A magnitude relation among J, H, and K is normally J<<H<K. Max(Y,Z) means the larger among Y and Z.

$$T=(F/G) \times \text{Max}(2 \times J+H, J+K) \tag{1}$$

FIG. 8 depicts, for comparison, operation when the processor core P11 performs the scheduling of all the initializing threads without transferring the master authority. As depicted in FIG. 8, if the master authority is not transferred, the scheduling of different initializing threads is not performed in parallel such that once the processor core P11 completes the scheduling A of the initializing thread a, the scheduling B of the initializing thread b is started. In this comparative example, equation (2) expresses a time T' from the time when the initial setting of the processor cores P11, Q12, R13, and S14 is completed by the activation of the kernel cores until the initialization of devices is completed by F initializing threads.

$$T'=(F/G) \times (H+J+K) \tag{2}$$

The scheduling time includes the time consumed to search for a processor core not executing a process, for example. The initialization time includes the time consumed for generating context and the time consumed for initializing the devices (such as setting an initial value for a register), for example. The communication between processor cores generally requires about 10 cycles for each communication at a ½ clock of the operation clock of the processor cores.

As an example, the number F of initializing threads is assumed to be 100, the number G of processor cores is assumed to be 4, the average scheduling time H of processor cores is assumed to be 1 ms, the average communication time J between processor cores is assumed to be 20 ns, and the average initialization time K of devices is assumed to be 3 ms. The operation clock of processor cores is assumed to be 1 GHz. From equation (1) described above, the time T until the initialization of devices is completed by the F initializing threads is 75 ms in the second embodiment. On the other hand, from equation (2) described above, the time T' until the initialization of devices is completed by the F initializing threads is 100 ms in the comparative example. Therefore, according to the second embodiment, the activation time of the apparatus can be improved by 25% as compared to the comparative example. In an apparatus having a conventional single-core system (the number G of processor cores=1), when the operation clock of the processor core is 1 GHz, T' is about 400 ms from equation (2) described above. Therefore, according to the second embodiment, the activation time of the apparatus can be improved by 81% as compared to the apparatus having the conventional single-core system.

According to the second embodiment, the same effect as the first example can be obtained. In the second embodiment, processes and threads are not preliminarily allocated to respective schedulers. Therefore, if a user updates a system or adds a new function, added processes and threads are suitably assigned to the processor cores according to the current load information. Therefore, the second embodiment is suitable for embedded devices operated in a highly flexible manner such that a new function is added through user's operation as in the case of mobile telephone terminals, for example. The second embodiment is also applicable to an application activated in an initial state or an application already embedded in the product shipment stage in products having a fixed use such as embedded devices. In this case, a function table equivalent to the function table prepared for activation information of an operating system may be prepared for such an application. According to the second embodiment, the apparatus can be activated rapidly including the activation of such an application.

Although the first and second embodiments are described by taking a multicore processor with multiple processor cores built into one microprocessor as an example of a multicore system, the present invention is applicable to a multiprocessor equipped with multiple microprocessors in the same way. If the present invention is applied to a multiprocessor, the processor cores in the description correspond to processors.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multicore system comprising:
    a plurality of processor cores;
    one or more processes;
    a respective scheduler in each processor core of the plurality of processor cores configured to assign a process of the one or more processes to a processor core of the plurality of processor cores when having a master authority, the master authority being an authority to assign processes;
    a master controller performing control to repeat a cycle until all processes of the one or more processes are assigned, in which the respective scheduler in each processor core of the plurality of processor cores, respectively:
        receives the master authority,
        transfers the master authority to another scheduler in another processor core, the master authority being held by both the respective scheduler and the another scheduler, until the master authority is discarded by the respective scheduler, wherein the respective scheduler and the another scheduler may hold the master authority at the same time,
        assigns a process of the one or more processes to the each processor core of the plurality of processor cores,
        discards the master authority, and
        enters a state of waiting to receive the master authority from another scheduler.

2. The multicore system according to claim 1, wherein the respective scheduler having the master authority assigns a process of the one or more processes with a processor core reserved to the reserved processor core.

3. The multicore system according to claim 1, wherein after transferring the master authority, the respective scheduler acquires load information of the plurality of processor cores to assign the process to one of the plurality of processor cores having a lower load.

4. The multicore system according to claim 1, wherein the respective scheduler discards the master authority upon completing assignment of the process to a given one of the plurality of processor cores.

5. The multicore system according to claim 1, wherein the master controller returns the master authority to a predetermined respective scheduler of the plurality of processor cores when all processes of the one or more processes have been assigned.

6. The multicore system according to claim 1, wherein the process of the one or more processes is a process of initializing devices connected to the multicore system at activation of the multicore system.

7. The multicore system according to claim 1, wherein the process of the one or more processes is a program embedded in advance and executed at activation of the multicore system.

8. An activating method executed by a multicore system having a plurality of processor cores, and one or more processes, the method comprising:
    executing a cycle, wherein a respective scheduler in each processor core of the plurality of processor cores, assigns a process of the one or more processes to a processor core of the plurality of processor cores when having a master authority, the master authority being an authority to assign processes, the cycle including:
        receiving, by the respective scheduler in the each processor core of the plurality of processor cores, the master authority;
        transferring the master authority to another scheduler in another processor core, the master authority being held by both the respective scheduler and the another scheduler, until the master authority is discarded by the respective scheduler, wherein the respective scheduler and the another scheduler may hold the master authority at the same time;
        assigning a process of the one or more processes to the each processor core of the plurality of processor cores;
        discarding the master authority; wherein
        a master controller performs control to repeat the cycle until all processes of the one or more processes are assigned.

9. The activating method according to claim 8, wherein the assigning includes assigning a process of the one or more processes with a processor core reserved, to the reserved processor core.

10. The activating method according to claim 8, the method further comprising acquiring load information of the plurality of processor cores, after the transferring of the master authority, wherein
    the assigning includes assigning the process to one of the plurality of processor cores having a lower load.

11. The activating method according to claim 8, wherein the discarding includes discarding the master authority after the assigning of the process.

12. The activating method according to claim 8, further comprising returning the master authority to a predetermined respective scheduler of the plurality of processor cores when at the assigning, all processes of the one or more processes have been assigned.

13. The activating method according to claim 8, wherein the process of the one or more processes is a process of initializing devices connected to the multicore system at activation of the multicore system.

14. The activating method according to claim 8, wherein the process of the one or more processes is a program embedded in advance to be executed at activation of the multicore system.

* * * * *